Sept. 4, 1962          F. JONKER          3,052,150
APPARATUS FOR MAKING AND INTERPRETING PUNCHED CARD DATA
Filed April 18, 1956          6 Sheets-Sheet 1
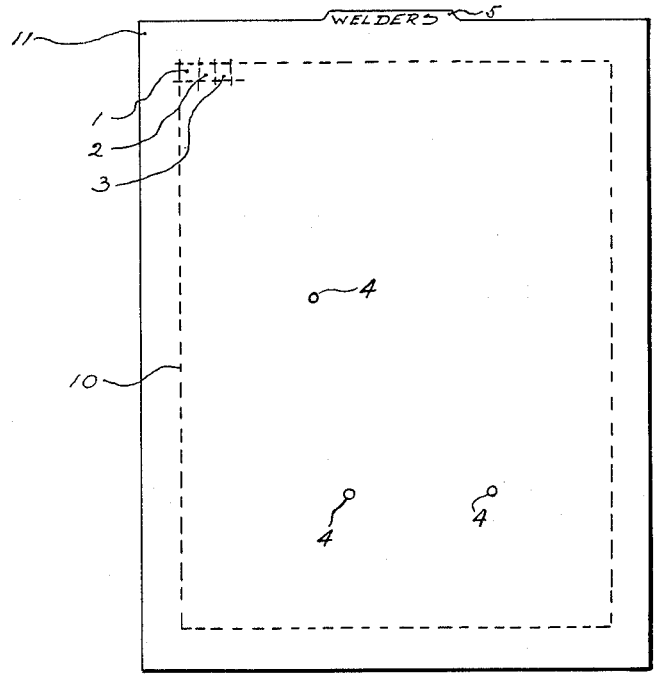
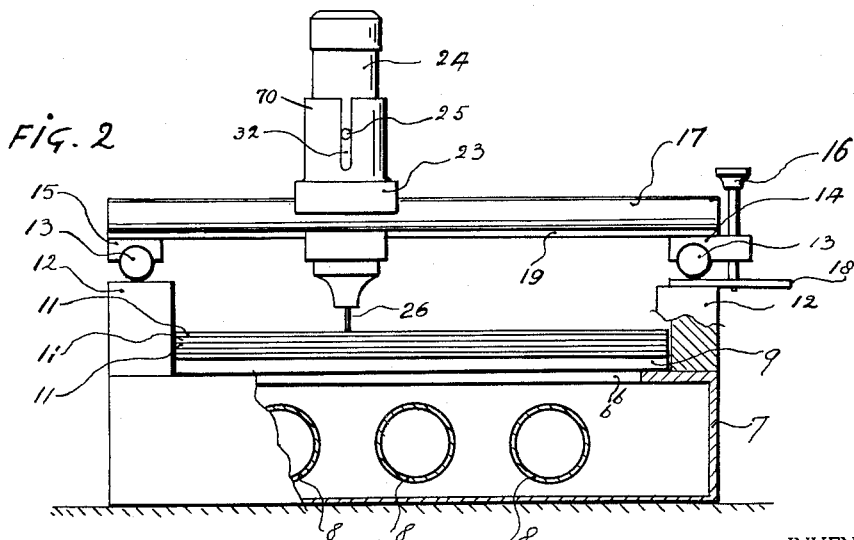
INVENTOR
FREDERICK JONKER.

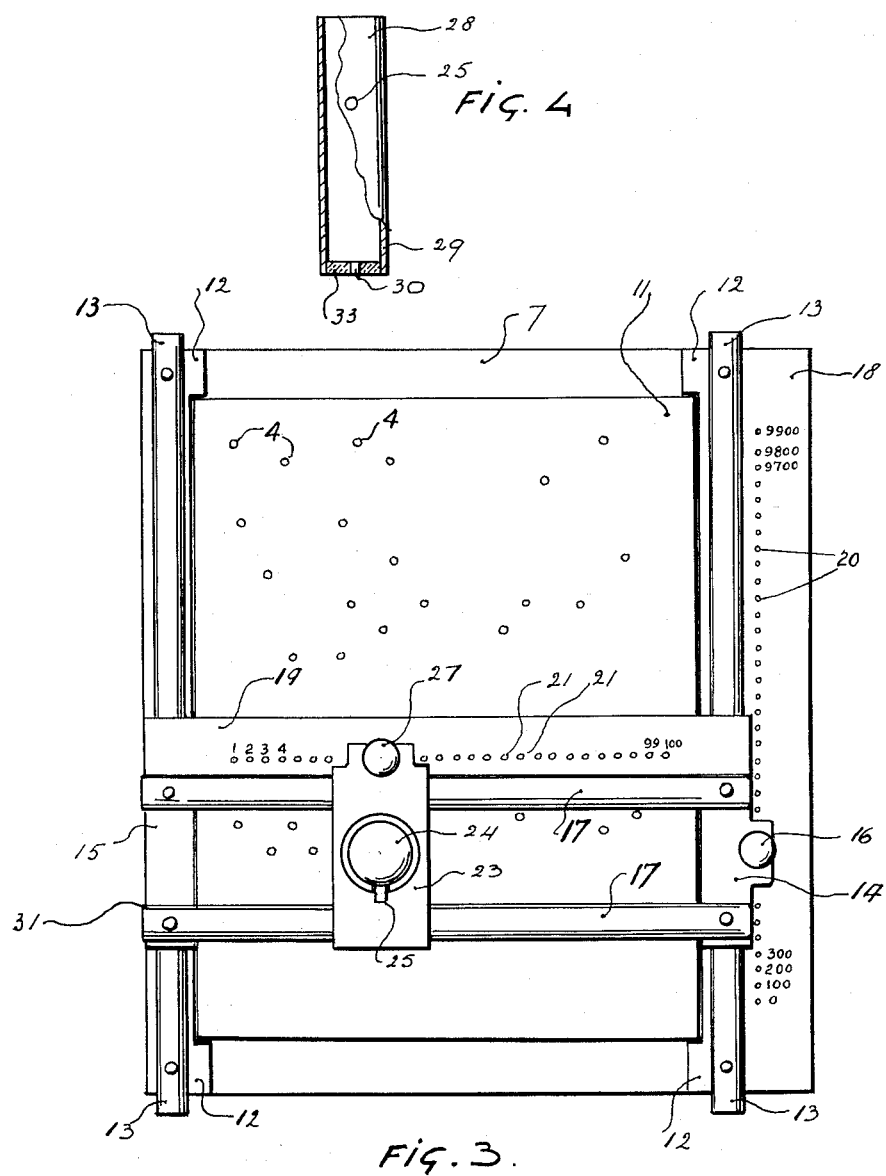

Sept. 4, 1962 F. JONKER 3,052,150
APPARATUS FOR MAKING AND INTERPRETING PUNCHED CARD DATA
Filed April 18, 1956 6 Sheets-Sheet 3
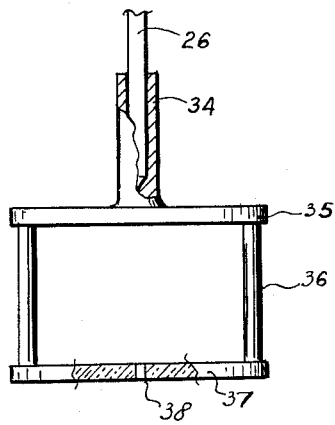
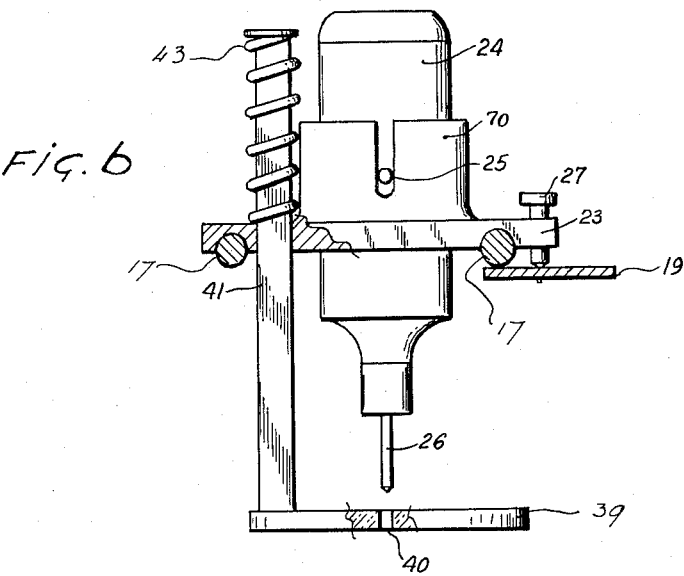
INVENTOR
FREDERICK JONKER Sept. 4, 1962 F. JONKER 3,052,150
APPARATUS FOR MAKING AND INTERPRETING PUNCHED CARD DATA
Filed April 18, 1956 6 Sheets-Sheet 4

INVENTOR
FREDERICK JONKER

INVENTOR
FREDERICK JONKER

Sept. 4, 1962   F. JONKER   3,052,150
APPARATUS FOR MAKING AND INTERPRETING PUNCHED CARD DATA
Filed April 18, 1956   6 Sheets-Sheet 6

INVENTOR
FREDERICK JONKER.

United States Patent Office 3,052,150
Patented Sept. 4, 1962

3,052,150
APPARATUS FOR MAKING AND INTERPRETING PUNCHED CARD DATA
Frederick Jonker, Takoma Park, Md., assignor to Jonker Business Machines, Inc., a corporation of Delaware
Filed Apr. 18, 1956, Ser. No. 579,110
4 Claims. (Cl. 88—1)

The present invention is based on the so-called "Peek-a-boo" information control principles, and provides an apparatus to perform the functions of this information control principle in a more convenient and economical manner.

The so-called "Peek-a-boo" information control system basically provides an index to a large number of items. These items can be documents or people or articles of supply, etc., in which cases the information control system then provides respectively a library-index, a personnel-index, or a supply-index. In describing the well known "Peek-a-boo" system, as well as the present invention, these systems will by way of an example be described in their application as a personnel-index. It should, however, be understood that numerous other applications of the invention are possible and that the invention does not limit itself to this application only.

With the so-called "Peek-a-boo" system, all items are numbered sequentially. For example, with a personnel index for 10,000 employees, these employees are numbered as follows: 1; 2; 3; 4; 5 . . . 9,997; 9,998; 9,999; 10,000. Personnel will, in general, be classified by such classes as wage class, age class, sex, educational classification, professional training classification, present job classification, special skills, security classification, physical fitness classification, family and children, life insurance, hospitalization, and numerous other classes; for example, a total of 225 classes. Each person is, of course, classified by a number of these classes.

With the so-called "Peek-a-boo" system a large card of a suitable opaque material is dedicated to each of these classes, so that there will be in the example under discussion a total of 225 cards. Each of these cards has a small area dedicated to every item or, in this case, every person. On every one of the 225 cards, the same area is dedicated to the same item or in the case of the example under discussion, the same person. In the example under discussion each card will then have 10,000 of these dedicated positions.

A certain person, for example, employee #2531, is entered into the system by making a hole at position #2531 in each of the cards dedicated to the classes under which that person is to be entered.

If all personnel has in this manner been entered into the system, information can be retrieved from it in the following manner: If a company is for example interested in a listing of all personnel of a certain wage class and certain age class and a certain type of education, the cards dedicated to this particular wage class, age class, and educational class are superimposed and held up against a source of light. This will show if and where coinciding holes are present. Wherever there is a coincidence of holes the number corresponding to such holes designates employees having the required characteristics.

For a library index, the cards can be dedicated to the subject headings or classes of the library classification or to key words describing the information contained in the library, etc. For each application, the cards will, in general, be dedicated to different types of terms or symbols.

This system, the "Peek-a-boo" system, is well known in the art and no claim is made thereon.

However, the present invention provides an apparatus for conveniently and economically making holes in the cards in the required places. Moreover, the apparatus is adapted for making holes in the large number of cards simultaneously. The apparatus likewise comprises a light source to show up coincidence of holes of superimposed cards and means to read off the numbers dedicated to such holes conveniently. An important part of the invention is that it provides convenient means for cancelling certain items.

The manner in which this apparatus operates and the aforementioned advantages are obtained will now be discussed with reference to the accompanying figures in which:

FIG. 1 represents a view of one of the cards of this information control system.

FIG. 2 shows a side elevation, partly in cross section of the apparatus of this invention.

FIG. 3 shows top elevation of the apparatus of this invention.

FIG. 4 shows a side elevation, partly in section of the part used in the scanning operation.

FIG. 5 shows a side elevation partly in section of an alternative part that can be used in the scanning operation.

FIG. 6 shows a side elevation partly in section of the carriage having the drill, with a third alternative part that can be used in the scanning operation, mounted on said carriage.

Figure 7:
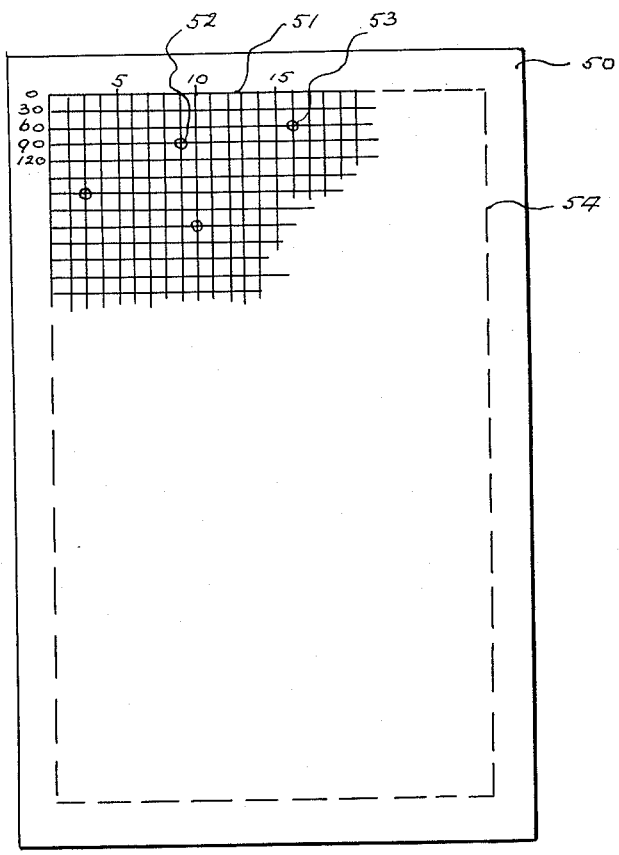
FIG. 7 shows a top view of a grid that can be used for readout and entry purposes.

In FIG. 1, which shows one of the cards of this information system, the dotted lines in the left top corner indicate schematically how certain positions on a card can be dedicated to certain items or, as in the example of a personnel file, to employees. Numeral 1 designates position #1, dedicated to employee #1; numeral 2 designates position #2, dedicated to employee #2; numeral 3 designates position #3, dedicated to employee #3, etc. The card shown in FIG. 1 is marked "welders" at the tab 5, and all employees, in the case of the example of a personnel file, classified as welders will have on this card a hole in the position dedicated to their number. Numeral 4 designates such positions. The large frame 10 shown in dotted lines delineates the working area of the cards, within which all dedicated positions are located.

In FIGS. 2 and 3, numeral 7 designates a lightbox, shown partly in section, with fluorescent lightbulbs 8, likewise shown in section. Numeral 9 designates a back-up plate, used only when drilling holes in the cards 11. Such a back-up plate 9 is necessary because the thin cards 11 do in themselves not have sufficient rigidity. When scanning the sheets for coincidence of holes, this back-up plate 9 is, of course, removed, and the light coming through the opening 6 in the lightbox 7 makes it possible to observe coincidence of holes in the cards 11.

Mounted on the lightbox 7 are two members 12. These members are shaped in such a manner that a number of the information cards 11 can be placed in superimposition between these two members and in this manner be held accurately aligned in superimposition in place in the machine.

Mounted on the members 12 are two guide rails 13. These guide rails serve as guides for a cross carriage 31, consisting of two rails 17 and two end-pieces 14 and 15 respectively resting on the rails 13. The rails 13 fit into semi-circular grooves in pieces 14 and 15. Cross carriage 31 can be moved parallel to itself along the guide rails 13. The rails 17 and 13 run perpendicular to each other.

A second cross carriage 23 can slide parallel to itself along the rails 17 of cross carriage 31. Mounted on this cross carriage 23 is a drill 24, for example, comprising an electric motor driving a twist drill 26. This drill 24 is slidably mounted in a vertical sleeve 70 in cross carriage 23 in such a manner that it can be moved downward in a direction perpendicular to the planes of the cards 11, so as to engage these cards and drill holes in the same. A guide pin 25 sliding in slot 32 prevents the drill from turning around its own axis due to the reaction torque. In general any of the conventional rotary drilling means, known in the art, can be used, whether electrically driven, driven by compressed air, or by hand, or any other suitable way.

The positioning of the drill 24 above the correct dedicated position is effected by means of parts 19 and 27, and parts 16 and 18. Part 18 is a ruler-like member mounted on one of the members 12 along one of the rails 13. It contains small holes 20 at distances corresponding to the width of the dedicated positions on the cards 11. A pin 16 slidably mounted in part 14, can be lowered into each of these holes 20 and thus lock cross carriage 31 at one of the coordinates of any desired dedicated position.

A similar ruler-like member 19 is mounted on cross carriage 31 along one of the rails 17. It too contains small holes 21, at distances corresponding to the width of the dedicated positions. A pin 27 slidably mounted in part 23, can be lowered into one of these holes 21 and thus lock cross carriage 23 at the other one of the coordinates of any desired dedicated positions.

The holes along the rulers 18 and 19 are marked by accession numbers. If each ruler would comprise 100 holes, the holes along one of the rulers, for example ruler 19, would be marked: 1, 2, 3, 4, 5 . . . 99. The holes along the other ruler 18 would in that case be marked: 0, 100, 200 . . . 9800, 9900. The number of a dedicated position will then correspond to the sum of the coordinates as read off from rulers 19 and 18.

Thus the invention provides an apparatus for conveniently and economically creating holes in a number of superimposed sheets at the desired position.

It is also part of the invention that this same apparatus can be utilized to observe coincidence of holes. In that case the back-up plate 19 is removed, so that coincidence of holes is made evident through light emanating through such holes from the light-box 7. To permit a convenient and rapid read-out of the numbers corresponding to these holes, the drill 24 is likewise removed simply by pulling it out of member 70, and replaced by the scanner 28, shown in FIG. 4. This scanner has a translucent bottom section 33, with a small hole 30 in the center. A guide pin 25 rides in slot 32 of the cross carriage 23. When this scanner is placed in cross carriage 23 and its bottom section 33 is placed into contact with the superimposed cards 11, the cross carriages 23 and 31 can be moved until the hole is exactly above a light-spot caused by coinciding holes in the cards 11. The coordinates of this number can then be read off from rulers 18 and 19 and added up to give the number of the dedicated position in which these coinciding holes are located.

Figure 15:
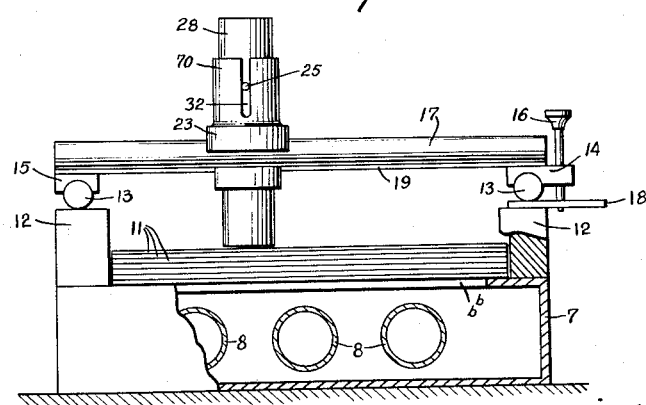
FIG. 15 shows the scanner, 28, of FIG. 4, mounted in the apparatus of FIG. 2.

FIG. 15 shows the device of FIGS. 2 and 3 with the drill 24 replaced by the scanner of FIG. 4.

A simpler form of scanner suitable for use with a conventional drill is shown in FIG. 5. This scanner is simply mounted on the twist drill 26. The circular disc 35 is made of completely transparent material. The disc 37 is made of translucent material. It contains a small hole in its center 38. A number of thin bars 36 connect these discs 35 and 37. Crosshairs can be provided on disc 37. By means of this aid, the drill 26 can now be rapidly and accurately placed at the position of the illuminated holes.

A third possible construction of a scanner is shown in FIG. 6. Here a translucent circular plate 39 having a hole 40 is supported by a rod 41 of square cross section, slidably mounted in carriage 23. A compression spring 43 tends to hold this scanner normally up and away from the cards 11. In this manner the scanner can stay permanently on carriage 23. It can be used whenever the drill is pulled up. To use the scanner, it has to be brought into contact with the cards, by pushing down on top of bar 41. Crosshairs can be provided in the disc 39.

Instead of the scanning aids shown in FIGS. 4, 5, and 6, the read-out of the coordinates of coinciding holes can also be performed by means of a translucent raster as shown in FIG. 7.

This read-out raster 50 is made of translucent material, for example plastic or any other suitable material. It is of the same size as the card 11 shown in FIG. 1. This translucent raster 50 features an area, drawn in FIG. 7 in dashed lines and indicated by numeral 54, equal in size to the working area 10 in FIG. 1. Drawn in this area in opaque lines is a raster having as many intersections as the cards 11 have dedicated positions. This raster is partly shown in FIG. 7.

In reading off the numbers of coinciding holes in a number of cards placed in the machine, the raster 50 is placed on top of these cards and the coordinates of the lightdots appearing on this raster are read off. The coordinates are marked in the same manner as the ruler-like members 18 and 19. The number of the dedicated position is then found by adding up the two coordinates. For example in FIG. 7, the number of hole 52 is 99, and the number of hole 53 is 66.

In information control systems of this general type it is of vital importance to be able to remove information from the system. For example, in a personnel index, the holes pertaining to employees who have left should be blanked off. If such an employee was entered on ten different cards, ten different holes will have to be blanked off. Blanking off ten holes would, for example, require ten different operations of dispensing an opaque sticker on the correct hole. After every operation the processed card would have to be removed from the machine and a new card inserted. This would be an extremely time consuming operation. Moreover, it would require a special dispenser of these opaque discs, while the presence of such discs on the cards 11 would create all sorts of problems in the storing and handling of the cards.

The present invention, however, makes it possible to cancel items by the same type of operation that enters items, and using the same equipment described above.

According to the present invention the system will comprise a translucent colored card, for example green. Every time an item has to be cancelled or, in the case of the example under discussion, every time an employee leaves, a hole is drilled in this green translucent card in the position corresponding to the number of the leaving employee.

This method of cancelling personnel in a personnel index has, of course, much broader applications. It can of course be used with any type of indexing apparatus. Moreover, it can be broadened to comprise several translucent sheets of different colors. In this manner modification of the information in the broadest sense of the word can be obtained by dedicating certain translucent colored cards to certain opaque cards.

The apparatus described above is intended for use in cases of the smallest holes placed at the smallest possible distance, when the greatest possible accuracy is, of course, required.

Figure 8:
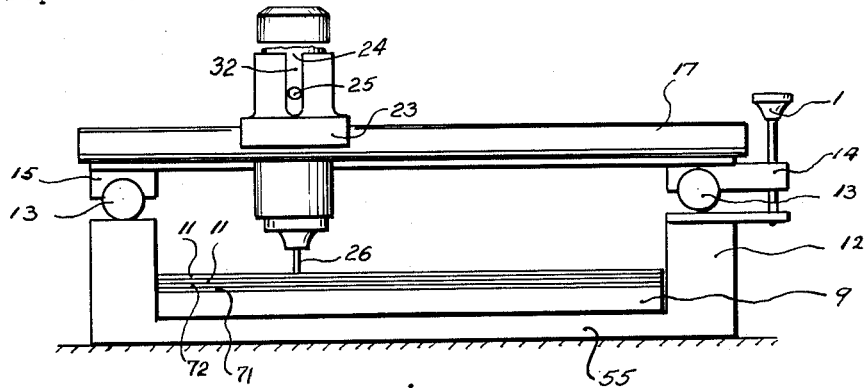
FIG. 8 shows a front view of a simplified version of the apparatus of FIGS. 1 and 2.

The apparatus shown in the accompanying drawings can, according to this invention, also be used without the lightbox 7. In that case, the lightbox 7 can be eliminated and be replaced by a solid bottom plate 55 as shown in FIG. 8. With this apparatus the scanning must be performed by light coming through the holes from the side of the observer. Such a simplified apparatus only works well, when the number of cards that are placed in superimposition for a scanning operation is small. If an undrilled card of a different color than the information control cards is held behind the superimposed cards, on the far side of the observer, the presence of coinciding holes can be observed. Numberal 71 in FIG. 8 designates this card. If the information control cards are, for example, black, and the undrilled card is, for example, red, red spots will indicate coinciding holes. In the case of the absence of the lightbox 7, a cancellation or modification card can still be used. It should have a color differing from that of the information control cards and the undrilled card, and could, for example, be green. Items are cancelled by drilling the positions corresponding to their serial numbers, on this green card. This card designated by numeral 72 in FIG. 8 should be placed between the undrilled card and the information control cards. Green spots will then indicate employees who have not left, and red spots will indicate employees no longer employed by that company.

In another embodiment of the present invention, the drilling means is held in the hand and the upper structure of the apparatus of FIG. 2, that is, the guide rails 13 and the cross carriages 31 and 23 are eliminated. This embodiment can be used when the number of dedicated positions on the cards is much smaller and the holes to be drilled can, therefore, be much larger. This in turn eliminates the need for accurate vertical guidance and accurate positioning of the drill, so that the drill can be held in the hand while drilling a hole in the superimposed cards.

Figure 9:
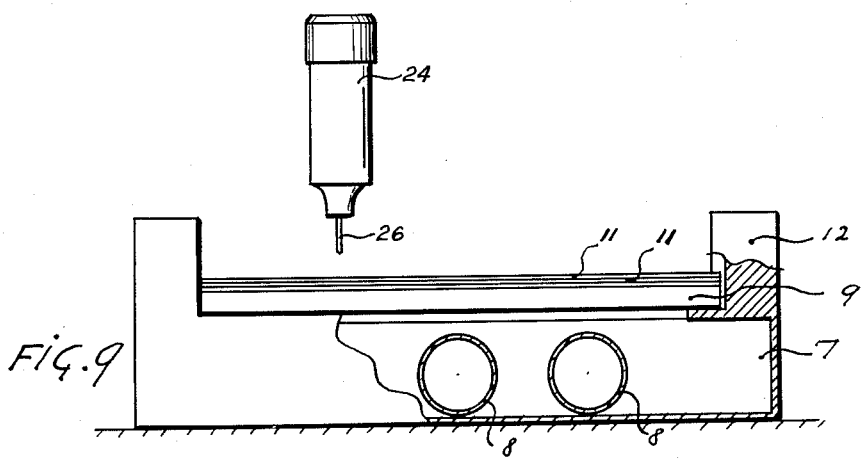
FIG. 9 shows a front view of another simplified version of the apparatus of FIGS. 1 and 2.

If a large number of cards will have to be scanned in superimposition for coinciding holes, a lightbox will still be required, as shown in FIG. 9. In that case the read-out can be performed by means of the translucent raster of FIG. 7. The positioning of the drill can of course likewise be performed by means of a raster as shown in FIG. 7, in which case holes will be drilled in this raster and a second raster will be used for read-out purposes.

Figure 10:
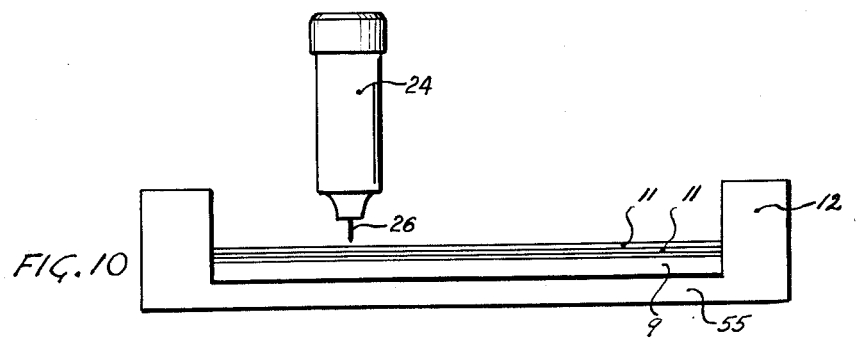
FIG. 10 shows a front view of another simplified version of the apparatus of FIGS. 1 and 2.

When only a small number of cards need by scanned in superimposition and the drill can be held in the hand, the apparatus assumes the simplest possible shape, shown in FIG. 10.

Figure 11:
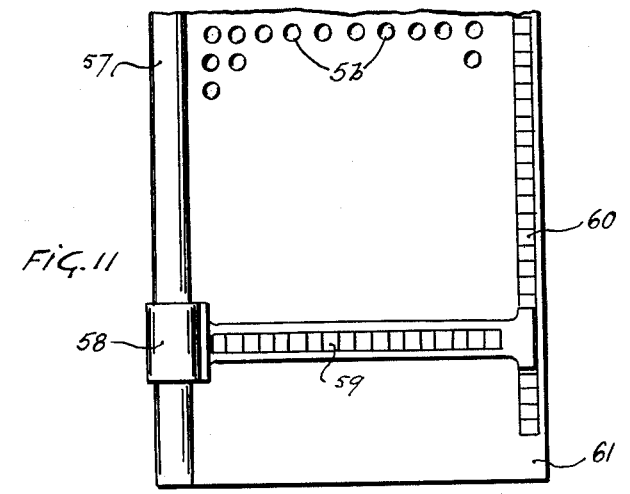
FIGS. 11 and 12 show a top view and front view respectively of a device to be used for information entry or readout purposes.
Figure 12:

According to the present invention a much more accurate and convenient operation of the apparatus of FIGS. 9 and 10 can be obtained by utilizing a template with pre-drilled holes to position the drill. Such a template is shown in FIGS. 11 and 12. For use it is placed on top of the cards 11. Numeral 56 designates a number of the pre-drilled holes, of which only a small number are shown. The template further comprises a rail 57 and sliding on rail 57 a sliding member 58, with a translucent scale 59 attached to it. Numeral 60 designates a fixed scale attached to template sheet 61. By means of these scales 59 and 60 the numbers of the holes can be read off for information entry as well as for information retrieval.

Figure 13:
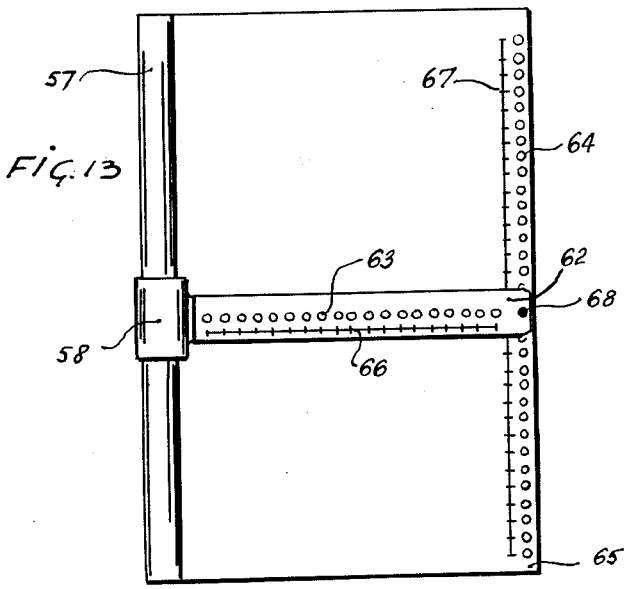
FIGS. 13 and 14 show a top view and front view respectively of a different device to be used for information entry and read-out purposes.
Figure 14:

According to the invention it is likewise possible to utilize the apparatus of FIGS. 13 and 14 as aid to position the drill and read out the number of the holes. This apparatus comprises a translucent sheet 65, with a rail 57 and on this rail a sliding member 58. Attached to this member 58 is a translucent member 62 provided with holes 63 and a scale 66 along these holes. Sheet 65 is provided with a vertical row of holes 64 and a scale 67 along these holes. A pin 68 attached to member 66 can be made to lock in the holes 64. In this manner, the holes 63 can serve to guide the drill in its action, and be used to read out numbers in information retrieval.

The foregoing specifications and drawings describe only a few possible constructional embodiments of the invention, while very many other different constructional embodiments are possible, all of which are comprised within the invention, as defined by the appended claims.

What I claim is:

1. Apparatus for making and interpreting punched card data records of the cordinate index type, comprising a flat horizontal frame-like support adapted to receive and support in registered relation a selected number (including the number one) of data record cards lying in flat superposed relation on said support, a rigid card-supporting plate removably positioned on said support, guide means secured to said support and extending parallel to one edge thereof, a first carriage mounted for movement on said guide means in a direction parallel to said edge and extending above and across the central area of said support, a cross carriage mounted for sliding movement along the first carriage in a direction perpendicular to said edge, a hollow socket element rigidly secured to said cross carriage with its axis substantially vertical, and interchangeable card-drilling and card-viewing devices selectively mounted in said socket element.

2. Apparatus in accordance with claim 1, including an illuminating light box disposed beneath and forming a mounting base for said support, to provide upwardly-directed illumination through record cards mounted thereon, when said rigid card-supporting plate has been removed.

3. Apparatus in accordance with claim 2, including discrete equi-spaced locating formations arranged lengthwise of said support and of said first carriage respectively, to define predetermined Cartesian coordinate positions of said cross carriage relative to said support.

4. Apparatus in accordance with claim 3, and retractable pin devices on said respective carriages, for cooperating with the respective formations on said support and said first carriage.

References Cited in the file of this patent

UNITED STATES PATENTS

| | | |
|---|---|---|
| 1,086,853 | Powers | Feb. 10, 1914 |
| 1,245,765 | Powers | Nov. 6, 1917 |
| 1,351,692 | Soper | Aug. 31, 1920 |
| 2,034,436 | Highstone | Mar. 17, 1936 |
| 2,075,856 | Leitz | Apr. 6, 1937 |
| 2,283,338 | Pegard | May 19, 1942 |
| 2,462,573 | Turrettini | Feb. 22, 1949 |
| 2,482,242 | Brustman | Sept. 20, 1949 |
| 2,645,152 | Martin | July 14, 1953 |
| 2,732,734 | Polliard | Jan. 31, 1956 |
| 2,756,822 | Jones | July 31, 1956 |